(12) United States Patent
Mori

(10) Patent No.: US 6,274,037 B1
(45) Date of Patent: Aug. 14, 2001

(54) COOLANT PURIFICATION SYSTEM

(75) Inventor: Kazuaki Mori, Iwata (JP)

(73) Assignee: Yamaha Hatsudoki Kabushiki Kaisha, Shizouka-ken (JP)

( * ) Notice: Subject to any disclaimer, the term of this patent is extended or adjusted under 35 U.S.C. 154(b) by 0 days.

(21) Appl. No.: 09/283,887

(22) Filed: Apr. 1, 1999

(30) Foreign Application Priority Data

Apr. 1, 1998 (JP) .................................................. 10-088379

(51) Int. Cl.[7] .................................................. B01D 36/02
(52) U.S. Cl. .................. 210/168; 210/223; 210/257.1; 210/258; 210/259
(58) Field of Search .................................... 210/168, 182, 210/184, 195.1, 222, 223, 257.1, 258, 259, 295, 297, 335, 340, 448, 503, 505, 508, 695, 248, 409, 512.1; 184/6.24

(56) References Cited

U.S. PATENT DOCUMENTS

| | | | |
|---|---|---|---|
| 2,303,261 | * 11/1942 | Dunmire | 210/168 |
| 4,247,398 | * 1/1981 | Mohri | 210/222 |
| 4,495,074 | * 1/1985 | Hagiwara et al. | 210/695 |
| 4,498,987 | * 2/1985 | Inaba | 210/223 |
| 4,571,302 | * 2/1986 | Willson | 210/111 |
| 4,618,431 | * 10/1986 | Hindman et al. | 210/137 |
| 4,764,271 | * 8/1988 | Acosta | 210/182 |
| 5,147,554 | * 9/1992 | Heck | 210/695 |
| 5,167,839 | * 12/1992 | Widmer, II et al. | 210/168 |
| 5,205,686 | * 4/1993 | De Caussin | 409/131 |
| 5,340,472 | * 8/1994 | Heck | 210/223 |
| 5,534,155 | * 7/1996 | Schimion et al. | 210/223 |
| 5,571,408 | * 11/1996 | Rising | 210/223 |
| 5,667,683 | * 9/1997 | Benian | 210/448 |
| 5,972,230 | * 10/1999 | Ely et al. | 210/797 |
| 5,980,735 | * 11/1999 | Bratten | 210/168 |

* cited by examiner

Primary Examiner—Joseph W. Drodge
(74) Attorney, Agent, or Firm—Ernest A. Beutler

(57) ABSTRACT

A coolant purification system for purifying and removing particles from the coolant used in machining operations. The system uses a rare earth magnetic separator in combination with bag-type filters and deep level filters that are arranged in sequences so that the filters that tend to clog more frequently due to the removal of small particles will not be clogged by particles that are easily removed by coarser filters of this system.

20 Claims, 16 Drawing Sheets

*Efficiency*

*Efficiency*

COOLANT PURIFICATION SYSTEM

BACKGROUND OF THE INVENTION

This invention relates to a coolant purification system and more particularly to an improved apparatus for removing foreign particles from the cooling and lubricating fluid used in machining operations.

In many types of machine operations, a coolant is supplied to the area being machined for a number of purposes. One of these purposes is to cool and lubricate the machining operation. The other and equally important purpose is to remove the machined particles as well as other foreign matter from the area where machining is occurring so as to improve surface finish.

Although in principle this appears to be simple and obvious, accomplishing these results and being able to operate the equipment over long periods without servicing presents substantial considerations. Environmental concerns also require the reclaiming of the coolant and lubricant and recirculation of it, and this adds greatly to the aforenoted problems.

In some ways, this invention relates to an improvement or an alternative arrangement for providing coolant purification to that shown in my copending United States Letters Patent of the same title, Ser. No. 09/063,017 filed Apr. 20, 1998, now U.S. Pat. No. 6,015,487, and assigned to the assignee hereof.

A prior art type of apparatus is illustrated in FIG. 1 and the effectiveness of various types of prior filtering materials utilized for coolant purification is shown in FIGS. 2 and 3. The apparatus shown in FIG. 1 includes a machining station 21 having a cutting tool 22 that operates to machine the surfaces of a work piece 23. In the illustrated embodiment, by way of example, the cutting tool 22 is a grinding wheel and the work piece 23 is a gear blank onto which gear teeth are formed by the grinding operation.

This grinding operation takes place over a catch tank 24 with a coolant supply nozzle 25 being provided so as to spray the cooling liquid to the machined area. This liquid is then collected in the catch tank 24 and is returned to a purification apparatus, indicated generally by the reference numeral 26, where the cutting liquid is collected in a storage tank 27. A pump 28 draws the coolant from the storage tank 27 and delivers it via the nozzle 28 to the machine area.

In the specific prior art example shown, the purification apparatus 26 comprises a centrifugal separator including an impeller element 29 that is driven by an electric motor 31 and which separates foreign particles from the coolant in a manner known. The purified coolant is returned to the storage tank 27 through a purification return line 32.

FIG. 2 shows the typical efficiency of this type of centrifugal apparatus by indicating the NAS value. This NAS value is a standard by which the number and size of entrain particles captured by the filter are measured. On the absissa, the size of particles is shown, while on the ordinate, the NAS number is indicated.

It will be seen that the centrifugal type separator is fairly consistent in the NAS number of the particles of varying sizes, but nevertheless does not exclude as many particles as desired, particularly those in the larger sizes, such as 50–100 μm. Thus its efficiency is not great.

Another type of filter which may be employed for purifying coolant and which has a higher filtration efficiency is the diatomaceous earth type. FIG. 3 shows the efficiency of this type of filter.

As may be seen in this figure, the efficiency is higher, particularly with larger size particles. However, this type of filter requires frequent servicing and hence is expensive to operate and does not afford long operational cycles between servicing. Also, the smaller size particles are more difficult to capture with this type of filter if reasonable flow velocities and small size of the filter are obtained.

Therefore, it is a principle object of this invention to provide an improved coolant purification system usable with machining operations that will remove with high efficiencies particles of a variety of sizes and which can be operated for long time intervals without necessitating servicing.

It is a principle object, therefore, to provide an improved coolant purification system for a machining apparatus that has high efficiency and long service life while permitting operation at lower cost.

SUMMARY OF THE INVENTION

In accordance with this invention, there is provided a coolant purification system for machining operation that includes a system for supplying coolant to the machined area and collecting the utilized coolant and purifying it. The purification apparatus includes at least a rare earth magnetic separator, bag filters, and a deep level filter that are disposed in a flow path along a coolant circulation arrangement and for returning the coolant to a storage tank for recirculation.

DETAILED DESCRIPTION OF THE PREFERRED EMBODIMENTS

Figure 1:
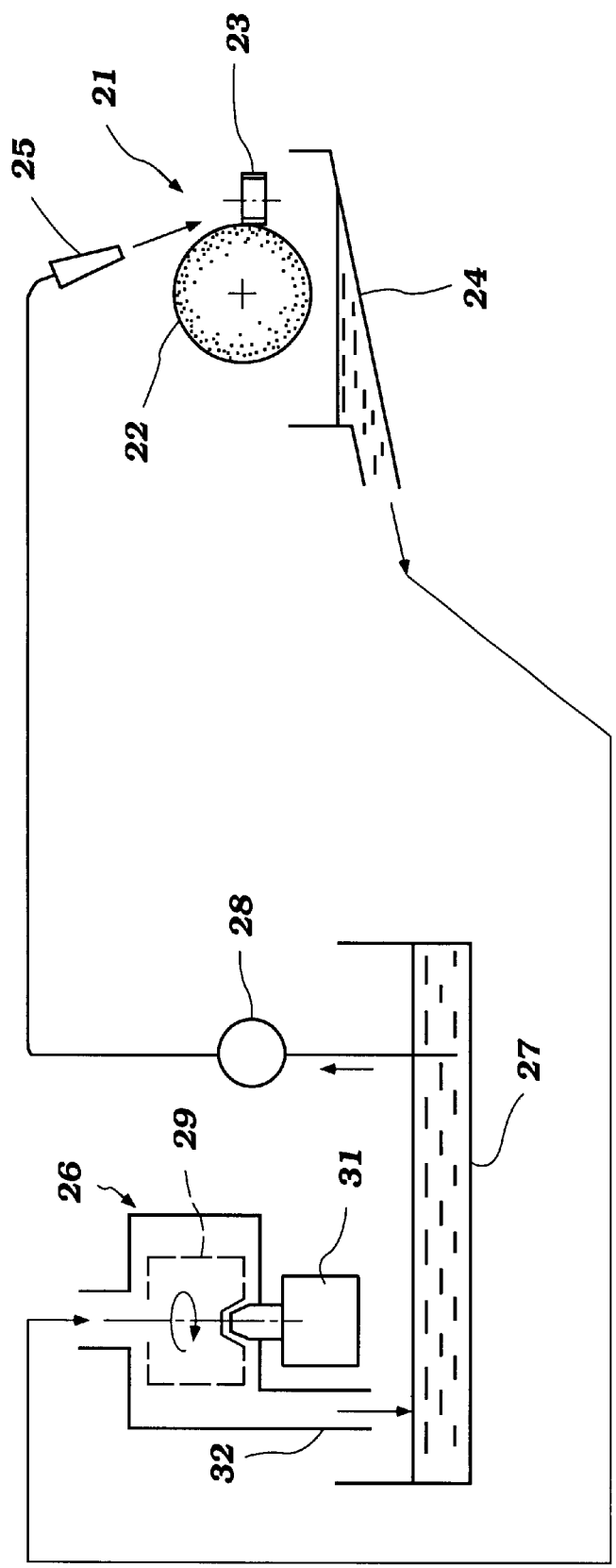
FIG. 1 is a schematic illustration of a prior art type of coolant purification system employing primarily a centrifugal separator.
Figure 4:
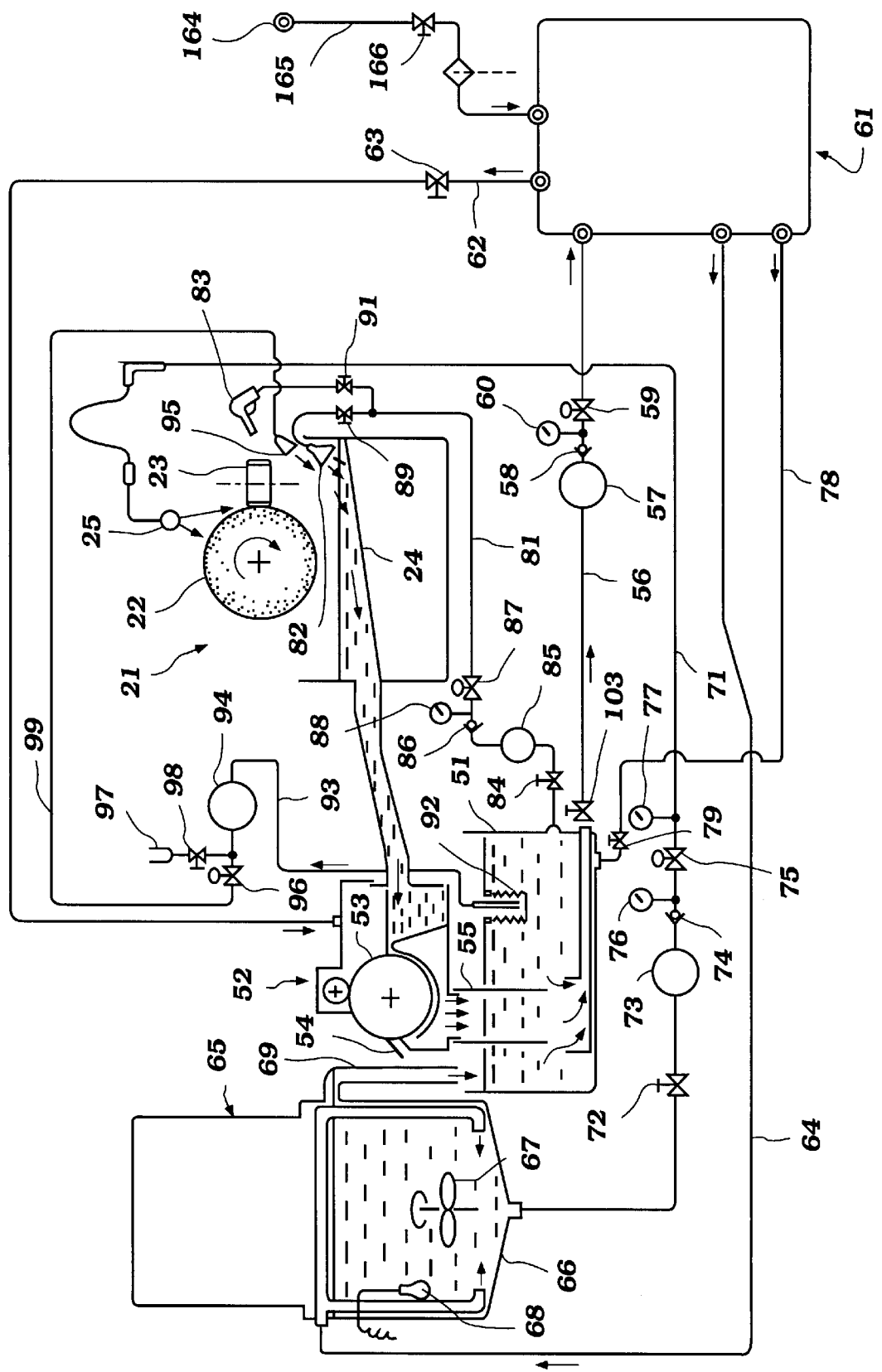
FIG. 4 is a schematic view in part similar to FIG. 1, but showing an embodiment of the invention.

Referring now in detail initially to FIG. 4, this figure shows a coolant purification system embodying the invention in conjunction with a machining apparatus which basically has the same general layout as a prior art type of apparatus and which, therefore, has been indicated by the same reference numerals applied in the description of prior art FIG. 1. Thus, this apparatus includes the machining section 21 wherein the grinding wheel 22 grinds the finished form on the gear blank 23. The coolant is supplied to the machining area by a spray nozzle 25 from the purification system.

This purification system includes a main coolant storage and collection tank 51. Coolant is delivered from the drain or collection tray 24 to this storage tank 51 by means of a rare earth type magnetic separator, indicated generally by the reference numeral 52. This separator includes a rotating magnetic drum 53 that operates to rotate through the collected fluid in a trough and remove the extracted particles through a discharge chute 54 before return of the purified coolant to the storage tank 51 through a return 55.

Figure 5:
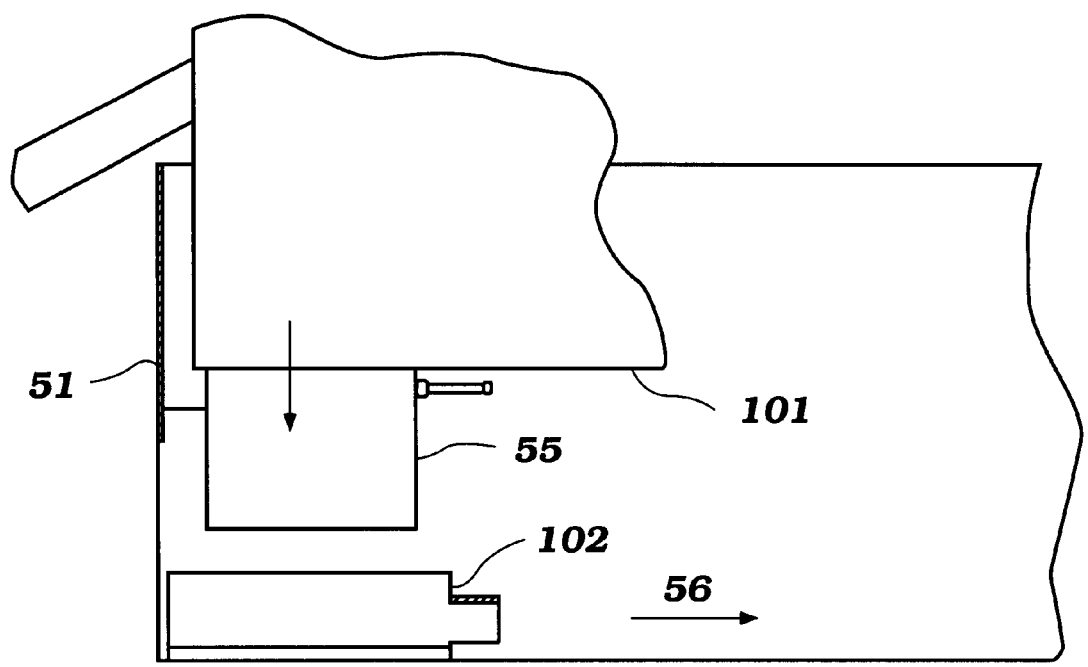
FIG. 5 is a partial cross-sectional view showing one embodiment of return arrangement to the main coolant storage tank.

The return 55 may have configurations as will be described later by reference to FIGS. 5 and 6 for controlling the flow amount and cooperates with a supply line 56 in which a pump 57 is provided. The pump 57 pumps fluid through a check valve 58 and past a control valve 59 to a mechanical filter assembly, indicated generally by the reference numeral 61, and which has a construction that will be described later in more detail by reference to FIG. 13. A pressure gauge 60 is placed in this line 56 between the check valve 58 and the flow control valve 59.

Air may be bleed from the mechanical filter assembly 61, through an air bleed path 62 in which a flow control valve 63 is provided and which communicates back with the rare earth magnetic filter 52 above the coolant level therein.

Fluid flows primarily from the filter element 61 through a main supply line 64 to a coolant (heat exchanger) cooler and purifier, indicated generally by the reference numeral 65. This type of device 65 includes a second storage tank 66 in which the fluid is contained and a suitable cooling arrangement for removing heat from the circulated coolant. This includes a circulating or agitating propeller 67 that circulates the coolant in the tank and also a sensor 68 which senses if the coolant falls to a low level to give a warning signal. An overflow line 69 permits excess coolant to flow directly back to the main storage tank 51.

The purified and cooled coolant from the coolant device 65 is delivered to the spray nozzle 25 through a conduit 71 in which an on/off valve 72 is provided upstream of a secondary pump 73. The pump 73 discharges into the line 71 through a check valve 74 and flow control valve 75.

Pressure gages 76 and 77 are disposed between the check valve 74 and the flow control valve 75 and downstream of the control valve 75, respectively. The conduit 71 then discharges directly to the spray nozzle 25 for delivering the coolant to the machining area.

Coolant from the filter 61 also may be returned to the main storage tank for cleaning purposes past the cooling device 65 through a drain return line 78. This will be described in more detail later. The drain return line 78 communicates with the lower level of the main storage tank 51 through an on/off valve 79 or in another manner to be described by reference to FIG. 13.

Coolant for flushing the catch tray 24 is also drawn from the tank 51 through a conduit 81 and delivered to a pair of spray nozzles 82 and 83. A main shut off valve 84 connects the main storage tank 51 to a high pressure pump 85 that discharges into the conduit 81. A check valve 86 and flow control valve 87 are provided in the line 81 with a pressure gauge 88 being disposed therebetween. The line 81 branches into two lines, each connected to a respective one of the spray nozzles 82 and 83. On/off valves 89 and 91 control the communication with the spray nozzles 82 and 83. These nozzles may be employed for flushing additional coolant into the catch tray 24 and returning it back to the rare earth magnetic filter 52 to remove accumulated particles even when no machining operation is being performed.

Figure 7:
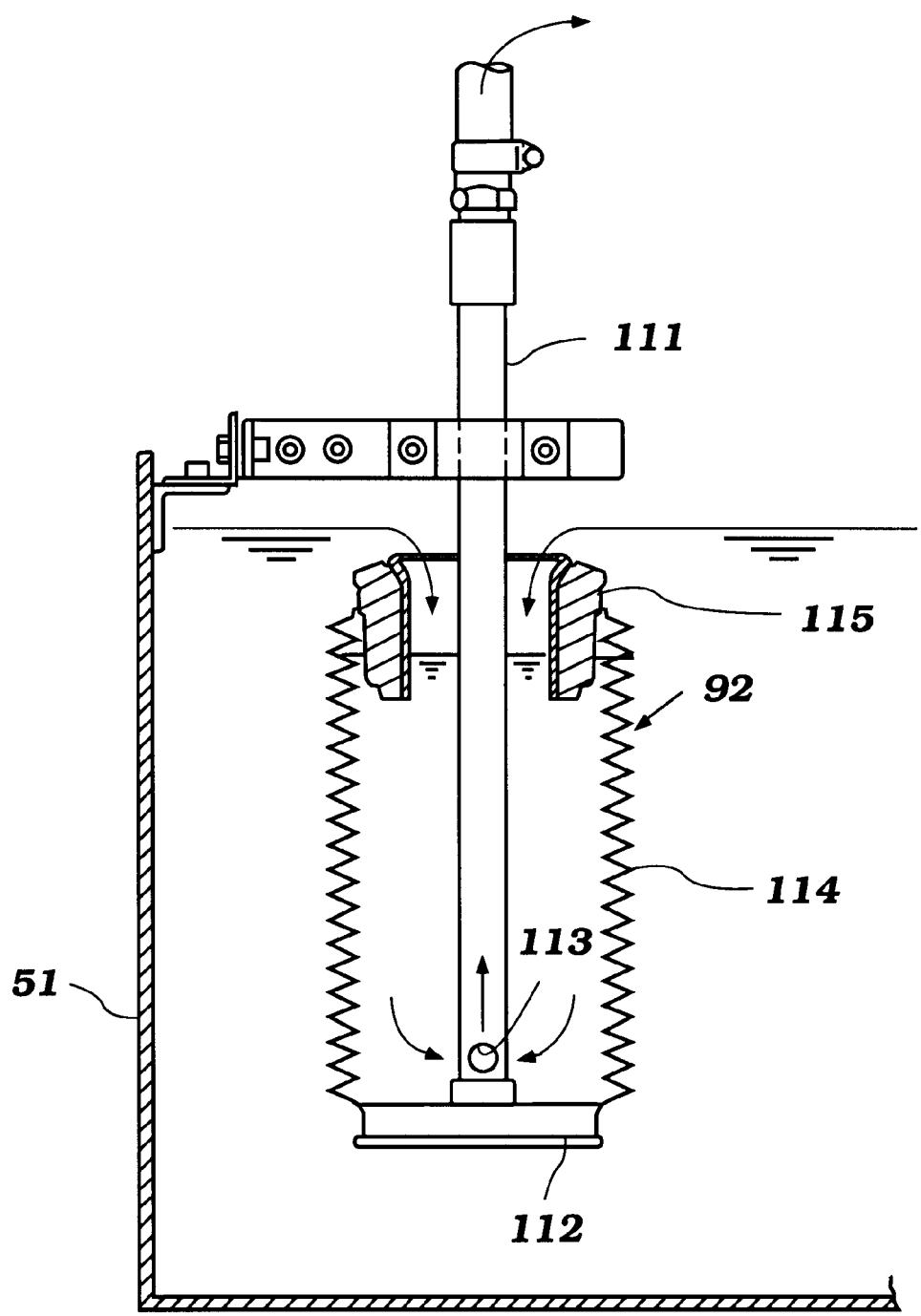
FIG. 7 is a cross-sectional view showing how the Q-pot works.

Finally, the main system also includes a Q-pot device, indicated generally by the reference numeral 92, which has a construction as will be described later by reference to FIG. 7 that serves the purpose of removing floating particles from the coolant and separating them. This Q-pot 92 has a pick up device that communicates with a further conduit 93 in which a pump 94 is provided. The pump 94 has the capability of supplying fluid to a further spray nozzle 95 through a line in which an on/off valve 96 is provided. A priming funnel 97 and on/off valve 98 is provided in the line 99 that extends to the spray nozzle 95 so as to start up this system if desired. This system can be used fir flushing the catch tray 24 as well as preventing these particles from entering the machining area.

Thus, on the basic principle of operation, the coolant is filtered first by the rare metal magnetic filter 52, floating impurities are removed by the Q-pot 92 and the fluid is filtered by the deep filter and bag filters in the filter unit 61. Then, the fluid may be passed through the cooler 65 for recirculation.

Embodiments of desirable ways in which the fluid is returned at controlled rates from the rare earth magnetic separator 52 to the main storage tank 51 will be described by reference to FIGS. 5 and 6. In the first of these embodiments, the main storage tank discharge 55 functions as a funnel formed at the bottom of a body assembly 101 of the separator 52.

This funnel 55 discharges to a further funnel 102 that is fixed to the lower wall of the main storage tank 51 and which is connected to the line 56 in which a main shut off valve 103 is provided. The opening of this funnel arrangement and the cooperation with the pump 57 is such that the pump 52 pumps a flow quantity $Q_2$ which is larger than the flow quantity of fluid that enters the magnetic separator 52 ($Q_1$). That is, $Q_2$ is greater than $Q_1$ ($Q_2 > Q_1$).

Figure 6:
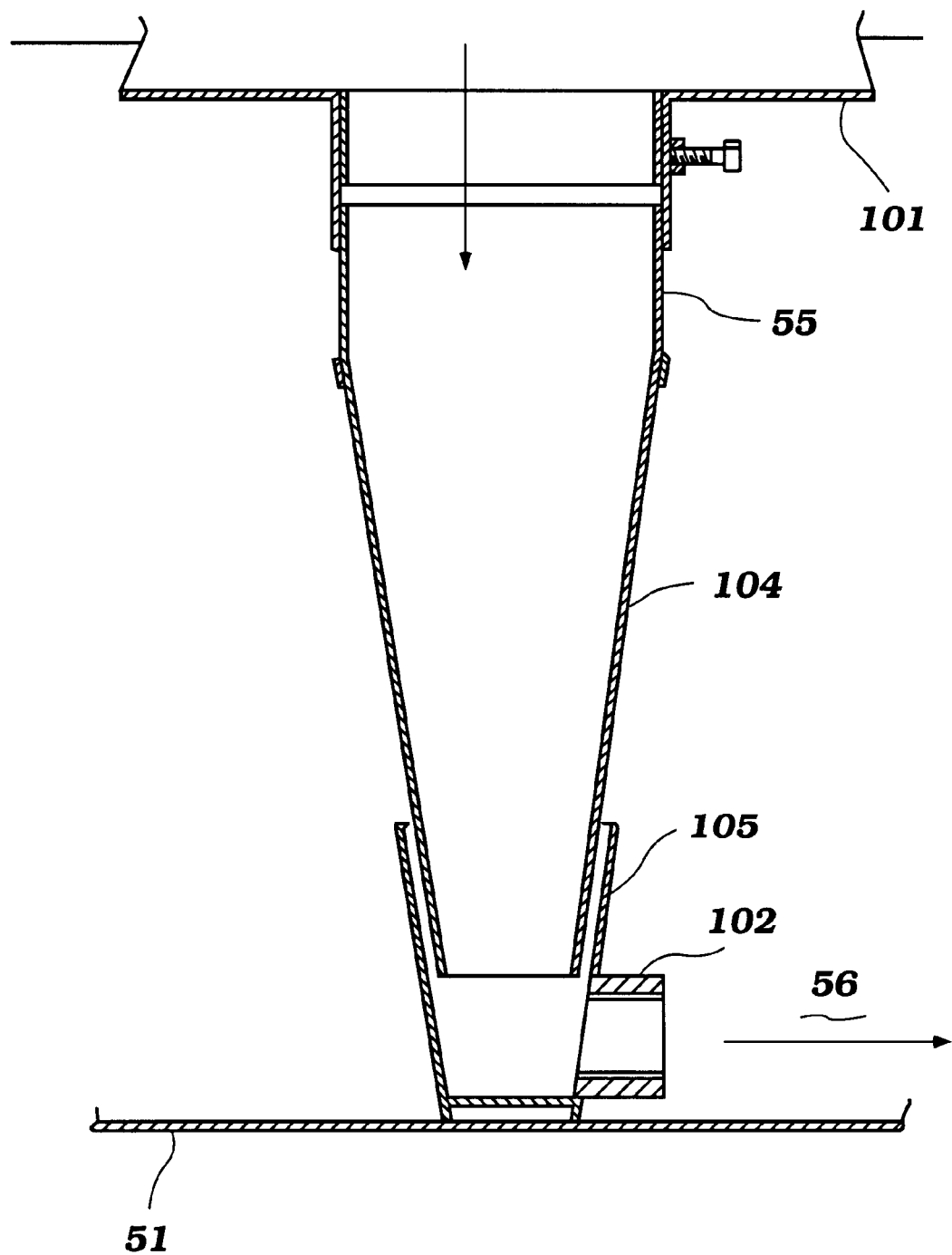
FIG. 6 is a cross-sectional view, in part similar to FIG. 5, and shows another arrangement for returning coolant to the main storage tank.

A modified configuration for accomplishing this result is also shown in FIG. 6 wherein the discharge section 51 is provided with a converging nozzle portion 104 that cooperates with a further conical shaped portion 105 of the discharge portion 102 and which communicates with the line 56. Again, the arrangement is such that the flow quantity $Q_2$ is greater than $Q_1$ ($Q_2 > Q_1$).

The structure of the Q-pot 92 will now be described by reference to FIG. 7 and later figures will describe how the fluid is returned to the main storage tank 51 so as to assist in the operation of the Q-pot by reference to FIGS. 8–11.

The Q-pot 92 is comprised of a central tube 111 that has a fitting 112 at its lower end above which is placed four, equally spaced flow openings 113. An elastic bellows 114, which is impervious in nature, is affixed to the end fitting 104 at its, lower end. The upper end of the bellows 114 is fixed to a ring 115 which surrounds the tube 111 but is spaced radially outwardly therefrom so as to permit a flow into this area, indicated as 117, as shown by the arrows in FIG. 7. Thus, any floating particles will be drawn into the bellows 114 and picked up through the openings 113 and drawn from the pick up 111 into the return lines 93 and 99 for continuous recirculation and redelivery to the rare earth magnetic separator 52. This will assist in ensuring that these floating particles do not find their way back into the cooling fluid that is delivered by the spray nozzle 25.

Figure 8:
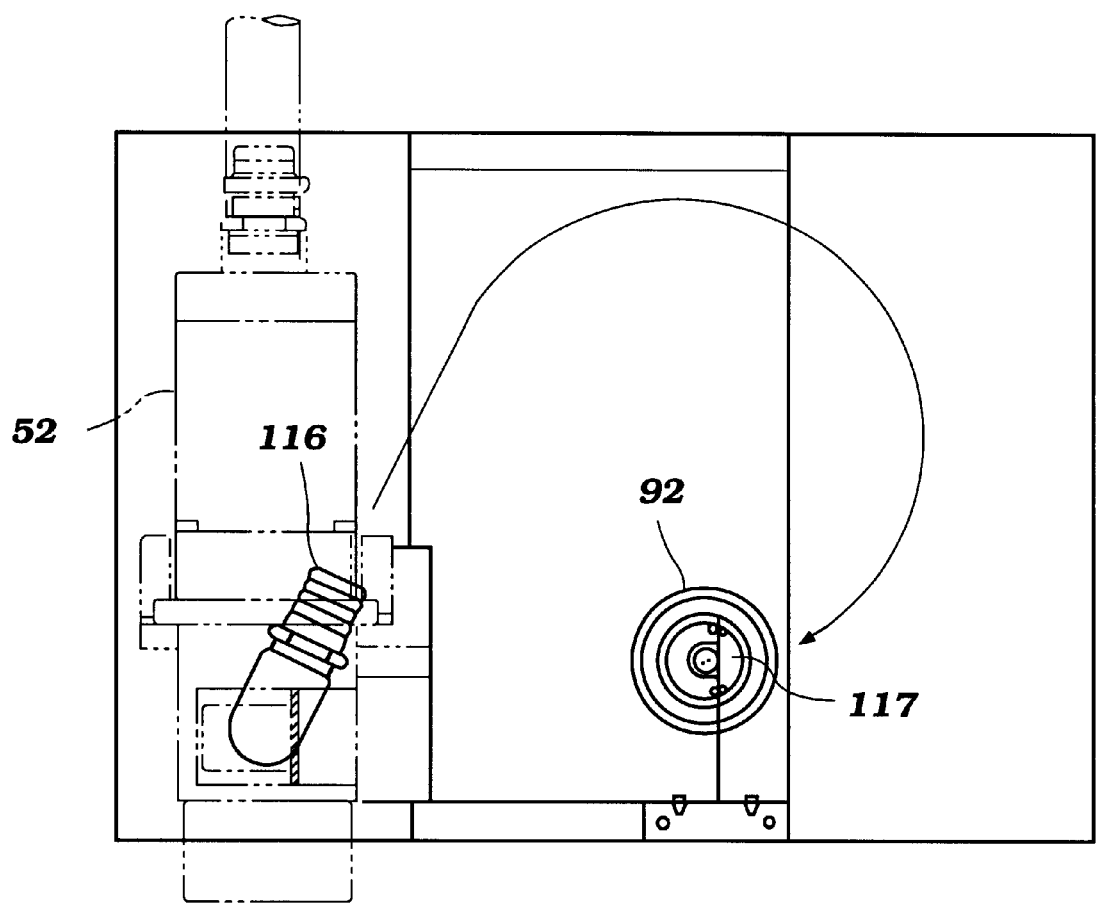
FIG. 8 is a top plan view showing the relationship of the fluid return and its cooperation with the Q-pot to improve efficiency.

As seen in FIG. 8, the magnetic separator 52 may be provided with a discharge port 116 that flows across the upper surface of the storage tank 51 so as to provide a swirling action toward the Q-pot 92 and specifically the inlet opening 117 formed at the upper end thereof by the member 15. This will assist in ensuring that these floating particles are skimmed off and prevented from being mixed with the coolant that is delivered by the spray nozzle 25.

Figure 9:
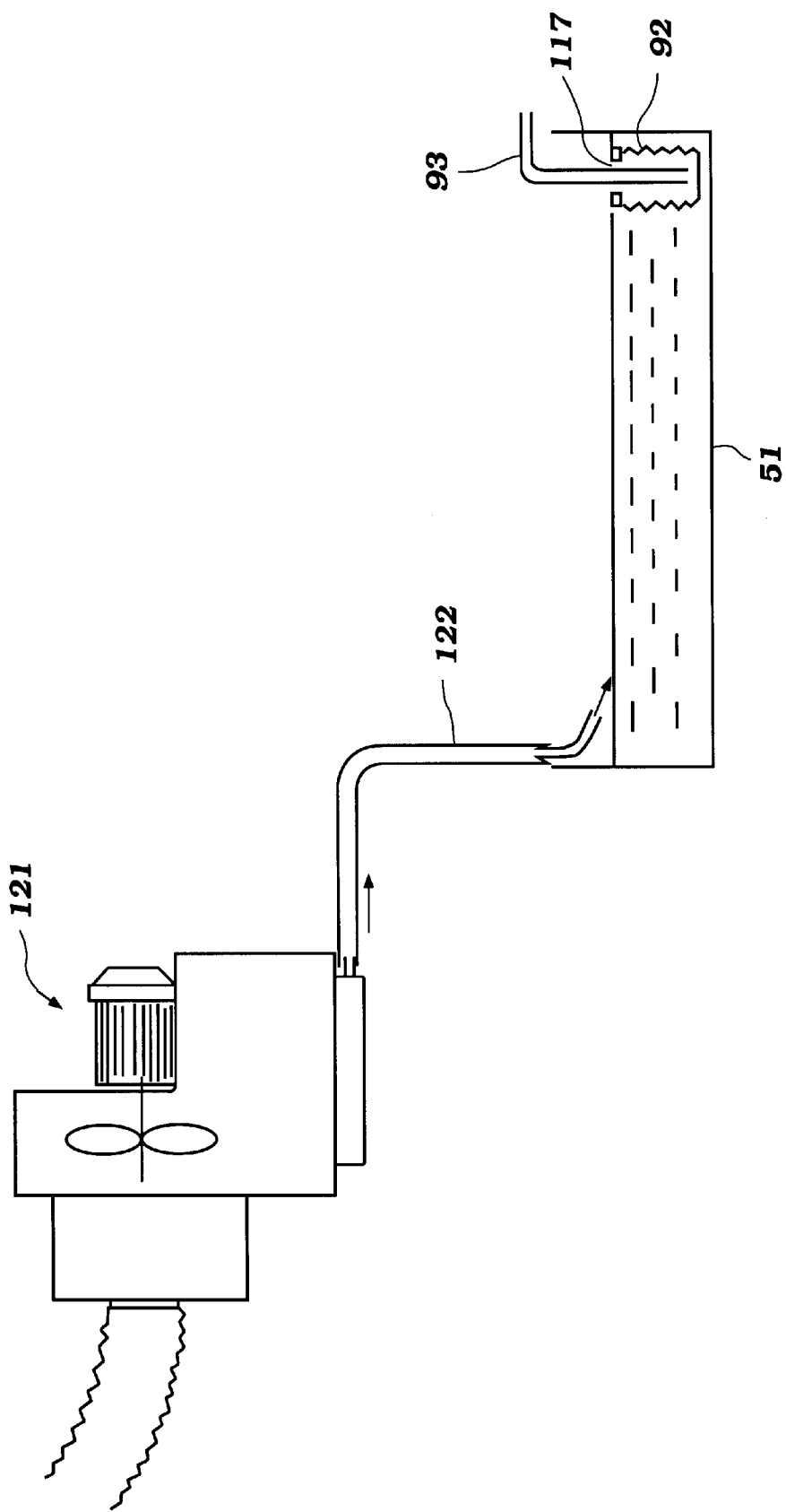
FIG. 9 is a cross-sectional view, in part similar to FIG. 8 showing another embodiment of fluid return to the Q-pot for improving efficiency.

FIG. 9 shows another way in which this can be done. In this figure, there is depicted a mist acquisition device 121 that functions to collect vapors from above the collection tray 24 and deliver them through a conduit 122 across the upper surface of the main storage tank 51. This will cause the foreign particles entrained into these vapors to flow directly toward the opening 117 of the Q-pot 92.

Figure 10:
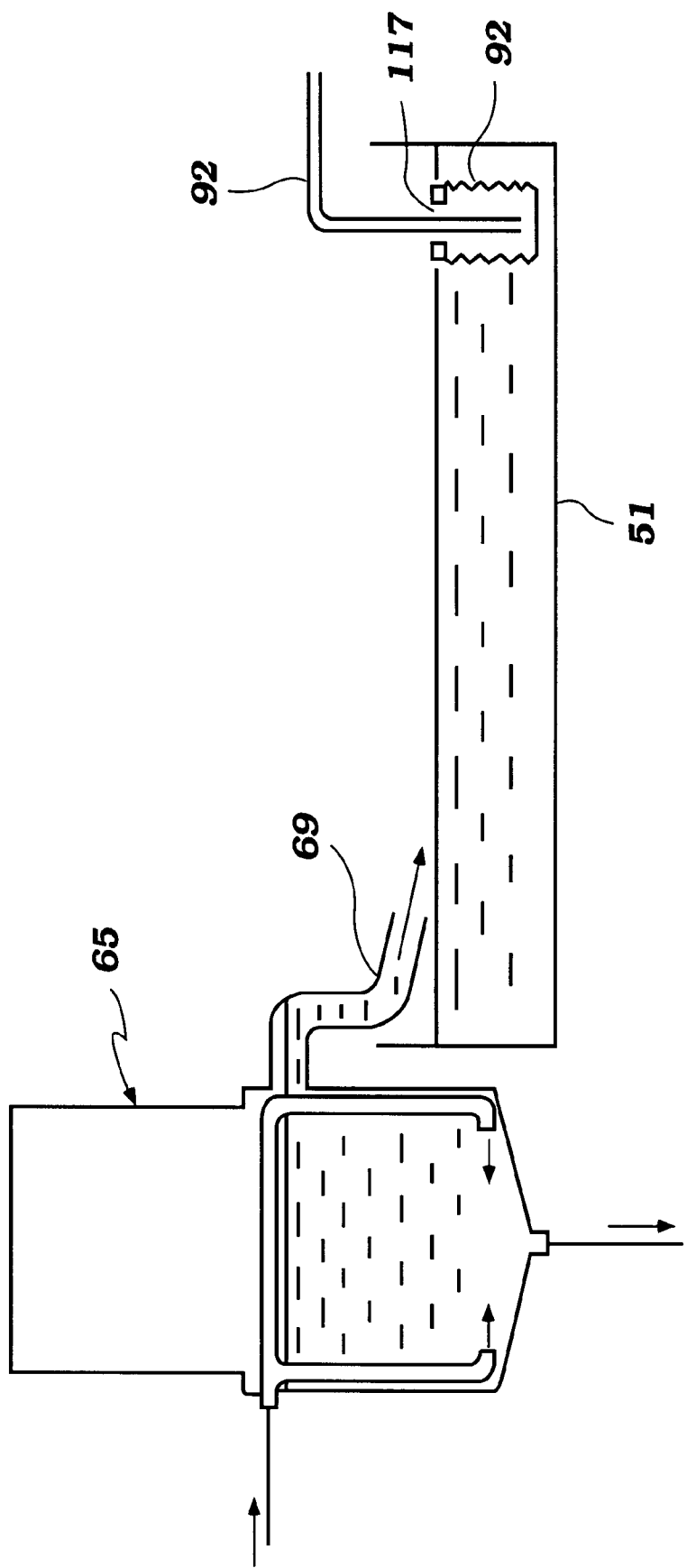
FIG. 10 is a cross-sectional view, in part similar to FIGS. 8 and 9, and shows yet another arrangement for returning fluid and improving the efficiency.

Also, as shown in FIG. 10, the overflow pipe 69 from the cooler 65 may also be so directed toward the upper surface of the liquid in the main storage tank 51 so as to direct the floating particles toward the opening 117 of the Q-pot 92.

Figure 11:
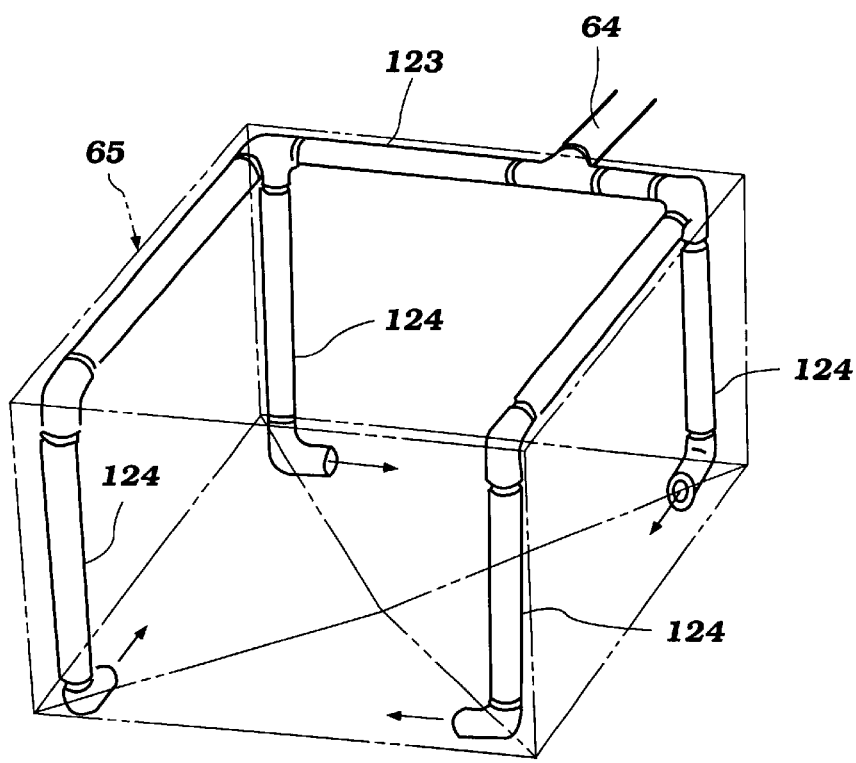
FIG. 11 is a perspective view showing an arrangement for a secondary storage tank for achieving centrifugal separation.

FIG. 11 shows another arrangement for assisting in the centrifugal separation of solid particles from the coolant that is delivered to the cooler 65. In fact, this shows more detail of the structure shown in FIG. 4 wherein the return conduit 64 mates with a manifold 123 which, in turn, has four depending pipe sections 124 at the four corners of the rectangular container and which have discharge nozzles so as to give a circumferential swirl to the fluid so as to provide centrifugal separation to a conical shape lower area for separation and draining periodically. The heavier particles will be thrown outwardly by the centrifugal action and then collected by gravity to the lower part of the conical section for periodic removal. This will reduce the frequency at which the tank 66 of the cooler need be cleaned.

The construction of the main mechanical filter assembly 61 will now be described in initial detail by primary reference to FIG. 12. As seen in this figure, and as previously described, the line 56 enters the filter assembly 61. This communicates with a main distribution line 131 which discharges to bag-type filters 132a, 132b and 132c that are disposed in parallel flow fashion, each having a respective inlet 133 from the line 131.

Each bag filter 132 is formed with a bag-like configuration having a woven or non-woven cloth made of a synthetic fiber and which may have meshes that are either the same size or in different sizes. However, the preference is to use a smaller number of bag filters with course meshes, particularly where the machining operation is such so as to not provide long length chips. In a preferred embodiment, the three bag filters 132a, b and c, have a mesh of approximately 40 μm.

The bag filters 132 all have respective discharges 134a, b and c that communicate with respective manifold lines 135a, 135b and 135c, respectively. These manifold lines extend at one end thereof to a main filter conduit 136 which, in turn, communicates with a deep filter element 137 through a line in which a main shut off valve 138 is provided.

The deep level filter 137 is formed from a lamination with woven or non-woven cloth of synthetic fibers with course cylindrical outer layers and progressively finer cylindrical inner layers. Thus, the larger particles will be accumulated in the external portion of this filter, and the smaller particles will be in the inner portion. However, by using a large number of small diameter cylinders, each having respective meshes, it is possible to contain the filter in a small volume and permit replacement of the cylinders, either as a group or individually. It is has been found that by utilizing filter meshes of 15 μm, it is possible to obtain a level of purification similar to that of a diamatatious earth filter.

A pressure gauge 139 and pressure sensors 141 are associated with the inlet to the deep level filter 137 and in a like manner, pressure gauges 142 are associated with each of the bag-type filters 132 with a pressure sensor 143 being connected to one of them.

A shut off valve 144 is provided at the outlet from the deep level filter 138 to the line 78 connecting the filter back to the cooler 65.

In addition, a clean out line 145 is associated with the deep level filter 137 for its cleaning purposes and this line has in it a main shut off valve 146, pressure gauge 147 and pressure sensor 148. This line can either be connected back to the return 64 or can be opened for drain purposes through a drain valve 149. The bag-type filters 132a, 132b and 132c may also be cleaned by opening a clean out line valve 151 which dumps the fluid through a diffuser 152 from a line 153 that parallels the line 136.

Figure 13:
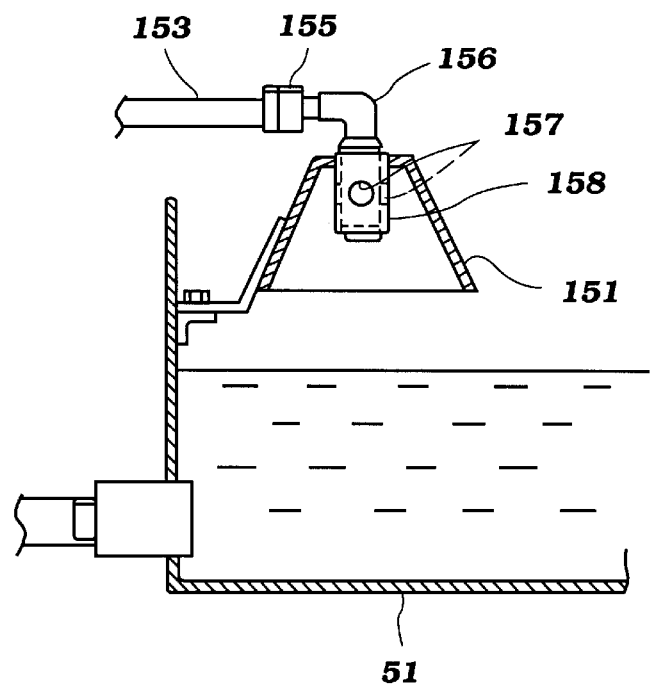
FIG. 13 is a cross-sectional view showing another arrangement for returning fluid and removed particles to the main storage tank.

The diffusion 152 is shown in more detail in FIG. 13 and communicates with the main storage tank 51. This diffusion 152 is coupled by a coupling 155 to the line 153 and has an elbow fitting 156 with discharge openings 157 spaced therearound. These are formed in a plug-like member 158 so that the discharge can be returned to the tank 51 through an upper surface thereof so that any floating materials cleaned can be removed by the Q-pot 92.

Figure 12:
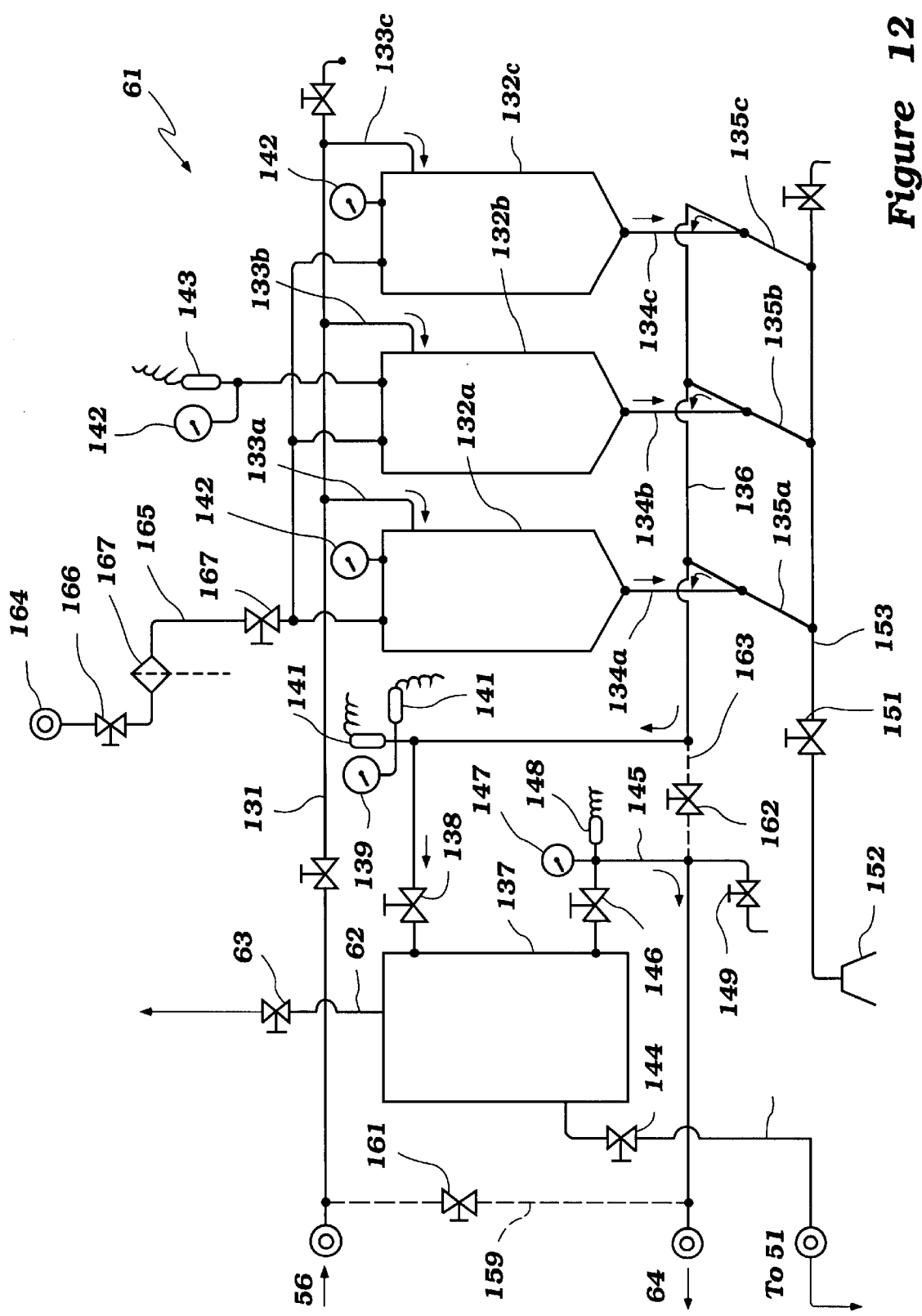
FIG. 12 is a schematic view showing the construction of the mechanical type filter arrangement including the bag and deep level filter arrangement of the construction shown only generally in FIG. 4.

If it is desired to run the system without utilizing the filter 61, it can be bypassed by means of a bypass line, indicated by the reference numeral 159 in FIG. 12 in which a shut off valve 161 is provided. If the filters are to be bypassed the shut off valve 161 is opened and the valves 161 and a further valve 162 in a bypass line 163 between the manifold branch 136 and the return line 145 is closed. At this time, the valve 146 should also be closed.

By utilizing the filters in the arrangement described, it is possible to obtain very high degrees of filtration and, at the same time, minimize the necessity for servicing the individual elements of the filtration system. This may be understood best by reference to FIGS. 14–17.

Figure 14:
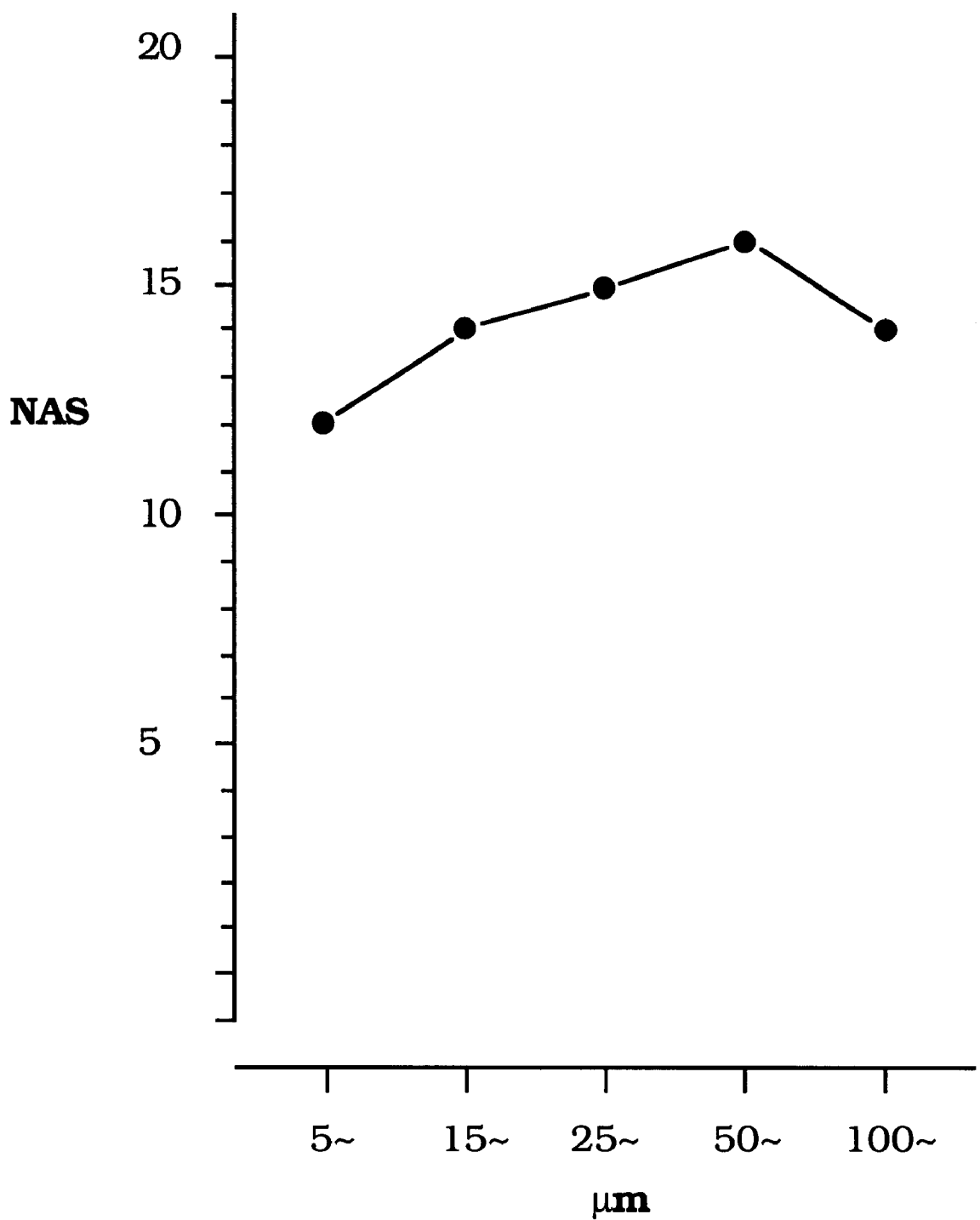
FIG. 14 is an efficiency curve showing the efficiency of the rare earth magnetic separator of this embodiment.

FIG. 14 shows the efficiency NAS of the rare earth magnetic separator 52. As may be seen, this picks out the larger particles and thus removes them before passing through the finer filters. Of course, the purification range is in the range of 12 to 16 NAS and hence very small particles are not removed in this portion of the system.

Figure 15:
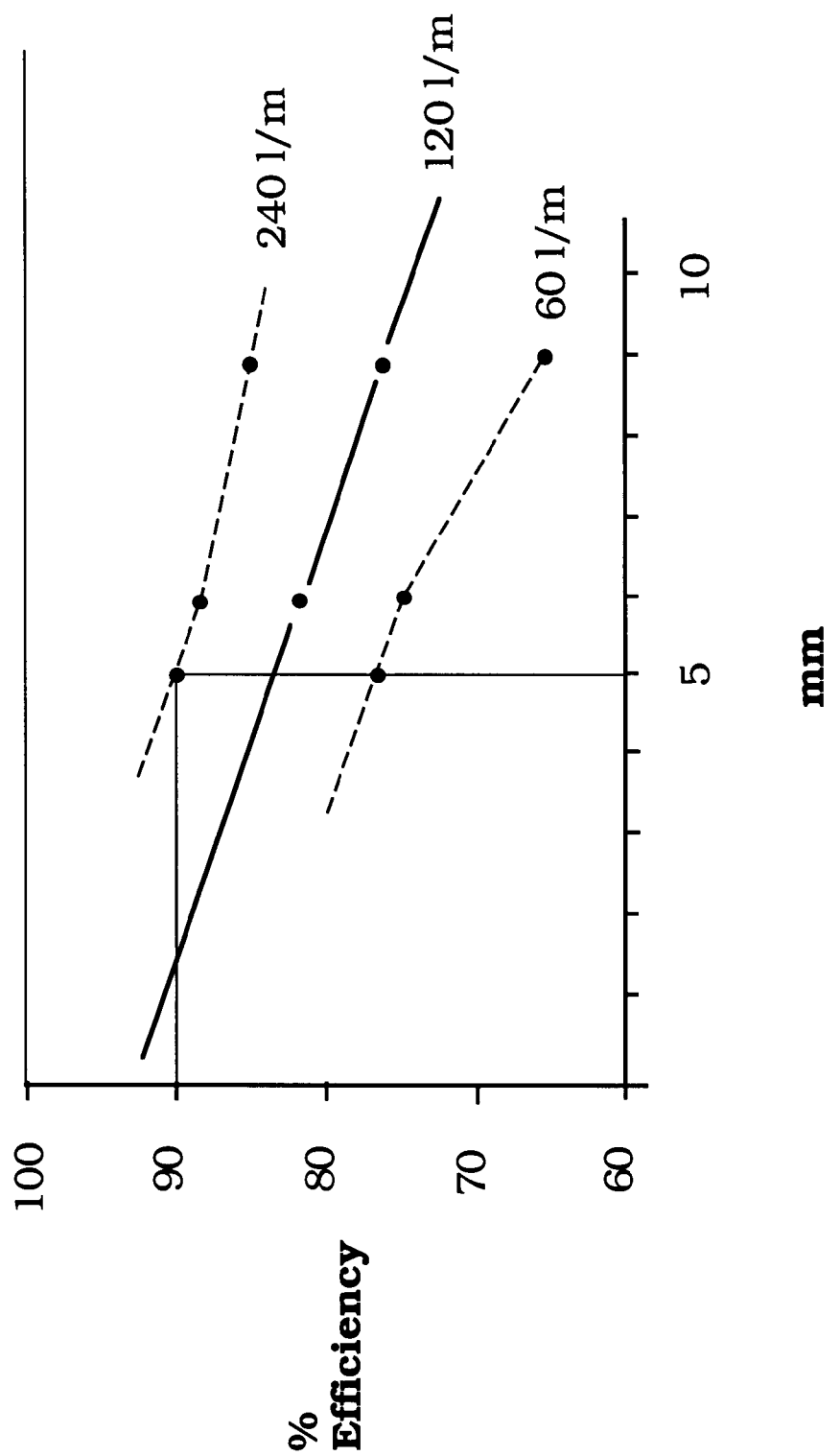
FIG. 15 is a graphical view showing how the relationship between the roller gap and the magnetic particle capture rate at varying flow quantities is effective in improving the service life of the magnetic type separator.

FIG. 15 shows the efficiency of the rare earth magnetic filter and how its capture rate raises in inverse proportion to the flow velocity. Also, the magnetic force by the magnet raises in inverse proportion to the square of the distance between the magnet and the particles.

The family of curves shown in this figure indicate the efficiencies with respect to these two characteristics. The spacing is indicated on the absessa, while the efficiency is indicated on the ordinant. Thus by using a high flow velocity of 240 liters per minute and a gap of five millimeters, it is possible to remove 90% of the larger particles, as well as particles which may be large but have low density. By utilizing this arrangement, the lives of the bag filters 132 and the deep level filter 137 can be prolonged considerably, for example, to two to six months in each case. Thus, this system provides very good filtration as well as long life.

Figure 16:
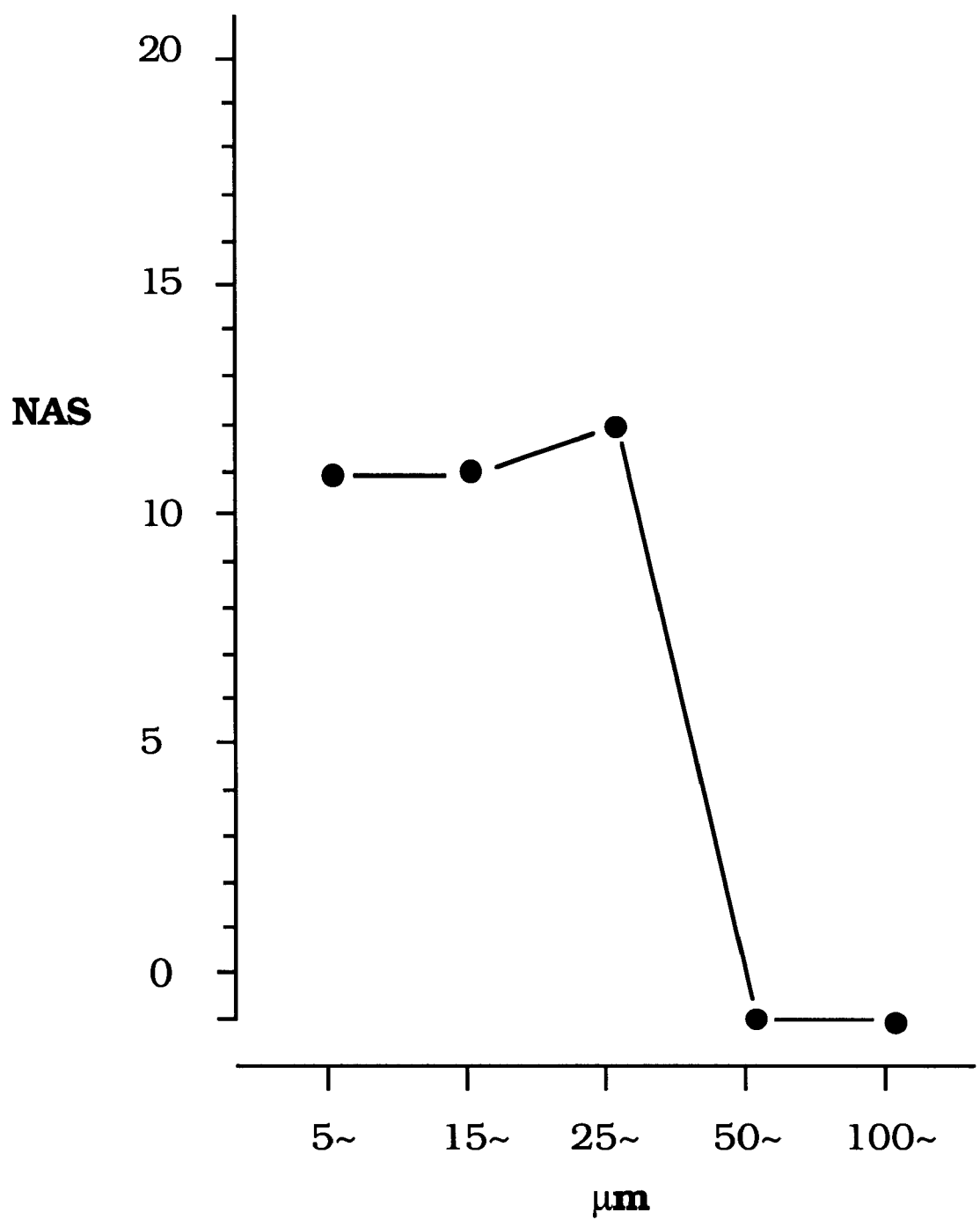
FIG. 16 is a graphical view showing the efficiency of the coolant purification degree through the bag filters.

FIG. 16 shows the purification ability of the bag filters 132. As may be seen, they are particularly efficient in removing particles of the size of 50 μm or larger and even have a good efficiency on smaller size particles. Also, because of the high efficiency of the bag filters even with very small particles, this means that the deep filter 137 can be operated for long periods without servicing, even though it is removing extremely small particles.

Figure 17:
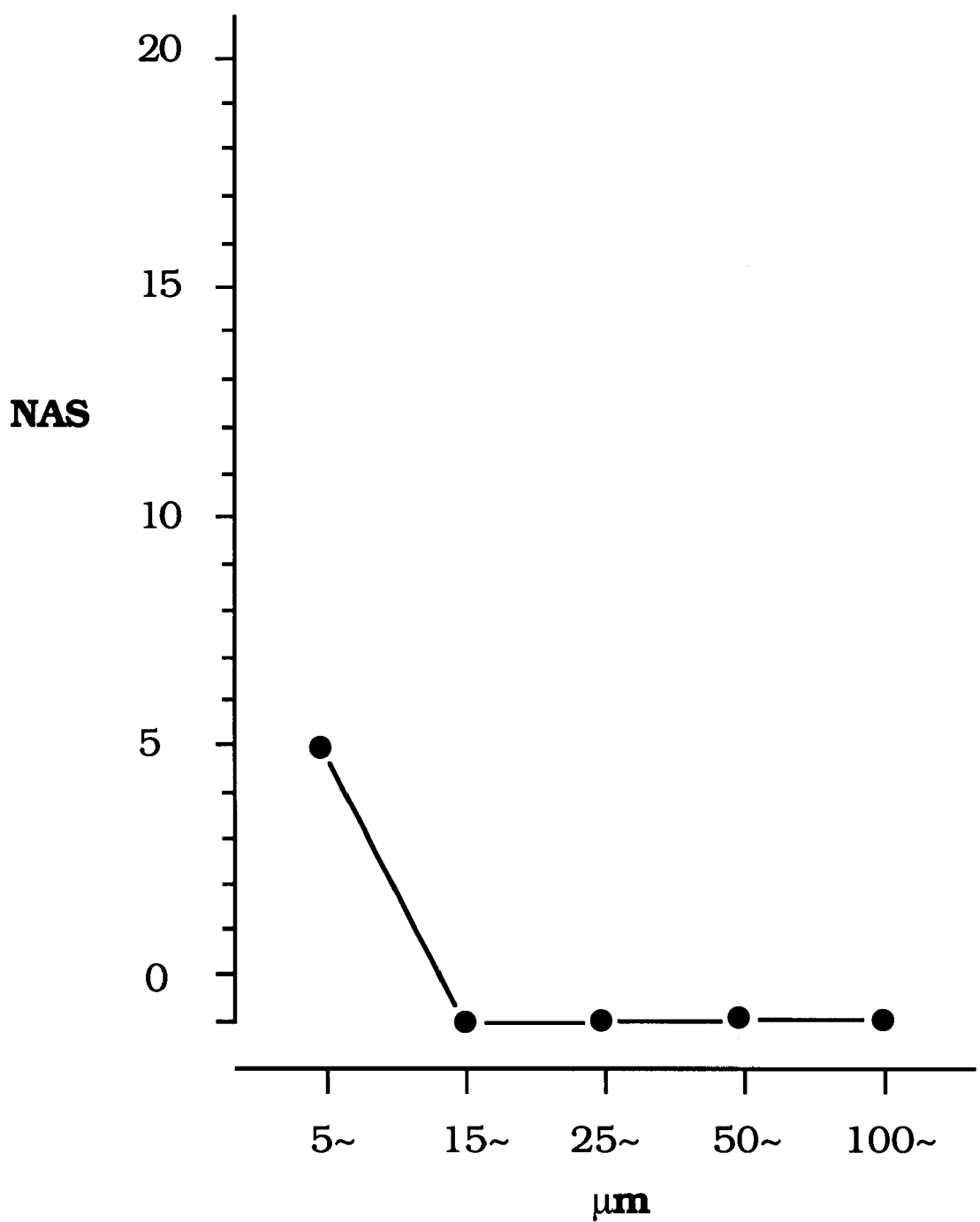
FIG. 17 is a graphical view showing the filtration efficiency or coolant purification degree of the deep level type filter.

The efficiency of this deep level filter is shown in FIG. 17 and it will be seen that it is extremely efficient and thus coupled with the efficiencies of the other filters provides not only good filtration capability but very long life without servicing.

There is also provided an arrangement that facilitates cleaning of the bag filters 132. Because of their nature, the grinding chips and cuttings will collect on the inner surface of the bag filters and form a cake which may get to 10 mm thick or even thicker. This makes it very difficult to drain the filters and also to clean them. Thus, in order to provide cleaning and breaking up of these congealed deposits, a cleaning system is incorporated that will be described by reference to FIG. 12.

Figure 2:
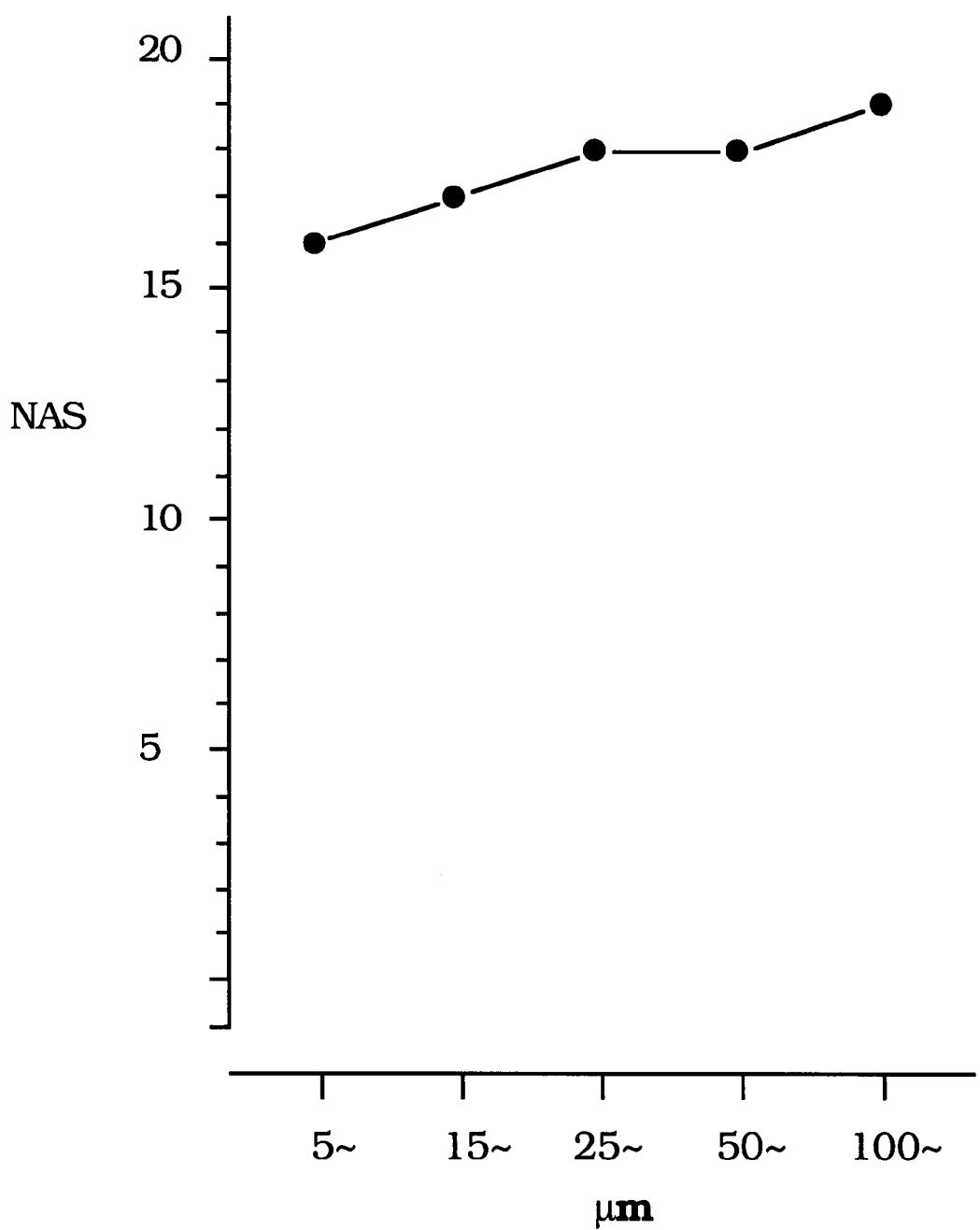
FIG. 2 is a graphical view showing the efficiency of the centrifugal separator.
Figure 3:
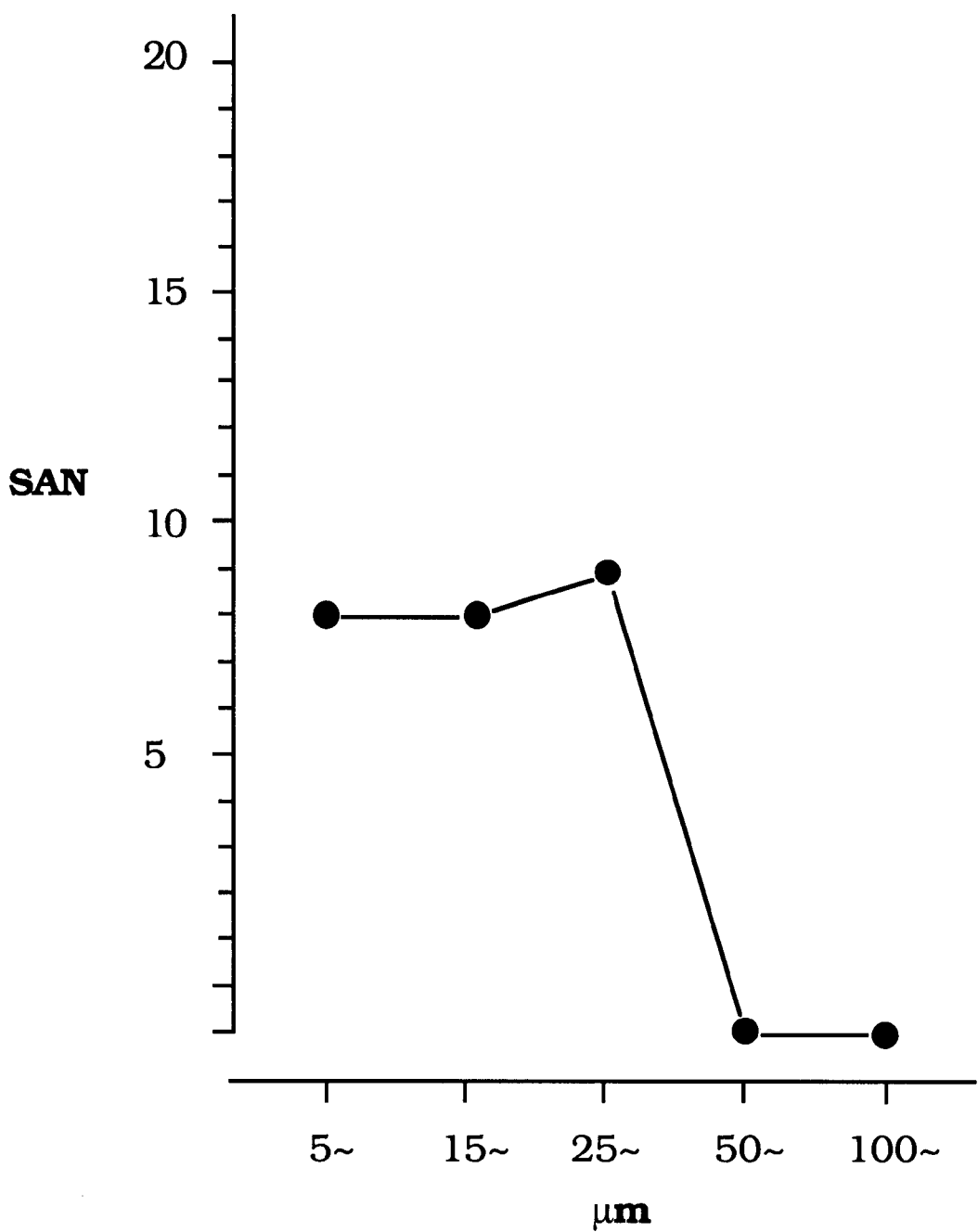
FIG. 3 is a graphical view showing the efficiency of a diatomaceous earth type purifier.

In order to provide this cleaning, the on/off valve 138 on the discharge side of the system is closed and the valve 151 is opened. In addition, there is provided a high pressure air source such as a factory air line, indicated at 164 in FIGS. 2 and 12 that communicates with the inlet sides of these bag filters through a conduit 165. Shut off valves 166 and 167 are provided in the line 166 as well as an oil separator 167 that separates any oil from the high pressure air line.

When the pressure is exerted and the residue is broken up, it will then be forced out of the discharge lines 134a, 134b and 134c and into the discharge line 153. By opening the valve 151, the diffuser nozzle 152 can deliver the sediment particles back to the storage tank 51 where they can be easily removed. The diffuser 152 will provide a collecting function to avoid disbursement of these particles and facilitate their collection.

Thus, from the foregoing description, it should be readily apparent that the described construction provides a very effective filtration system that will filter coolant for machining operations and which will operate for long time periods with minimum servicing and with minimum diminution of efficiency. Of course, the foregoing description is that of preferred embodiments of the invention and various changes and modifications may be made without departing from the spirit and scope of the invention, as defined by the appended claims.

What is claimed is:

1. A system for recovery and cleaning of foreign particles from a machining liquid coolant comprised of a coolant storage tank for storing coolant, a machining station wherein machining operation is performed, and a coolant circulating and purifying line for circulating coolant from said coolant storage tank to said machining station and back to said coolant storage tank, a rare earth magnetic filter for separating magnetic particles from said coolant and disposing of said separated magnetic particles to avoid reentry into the circulated coolant, and a mechanical filter for filtering said foreign particles from said coolant, said mechanical filter comprising at least one bag type filter and at least one deep level type filter, said coolant circuit and purifying line circulating coolant in a series relationship through said magnetic filter and said mechanical filter.

2. The system of claim 1, wherein the rare earth magnetic separator primarily removes particles having a larger particle size than the mechanical filter.

3. The system of claim 1, wherein the flow through the bag type filter and the deep level filter of the mechanical filter is in series relation.

4. The system of claim 3, wherein the bag type filter primarily removes particles having a larger particle size than the deep level filter.

5. The system of claim 4, wherein the rare earth magnetic separator primarily removes particles having a larger particle size than each of the hag type and deep level filters of the mechanical filter.

6. The system of claim 5, wherein the coolant is passed first through the rare earth magnetic filter, then through the bag type filter, and then through the deep level filter.

7. The system of claim 1, wherein the coolant storage tank is disposed below the rare earth magnetic filter and receives coolant therefrom by gravity flow.

8. The system of claim 7, further comprising a high pressure pump for collecting coolant from the coolant storage tank and delivering it to the mechanical filter.

9. The system of claim 8, wherein the pumping rate of the high pressure pump exceeds the flow rate from the rare earth magnetic filter to the coolant storage tank.

10. The system of claim 9, wherein a funnel arrangement discharges the filtered coolant from the rare earth magnetic filter for restricting the flow.

11. The system of claim 7, wherein the machining station has a tray where the coolant and machining particles from the machining operation are collected and returned to the rare earth magnetic filter, and further including a flushing system for delivering coolant from the coolant storage tank to said tray without passing through the machining station for flushing the foreign particles and spent coolant from the machining station.

12. The system of claim 11, wherein a first pump delivers the flushing coolant through the flushing system to the tray and a second pump pumps the coolant through the coolant circulating and purifying line.

13. The system of claim 1, wherein the mechanical filter comprises a plurality of bag type filters.

14. The system of claim 13, wherein there is a parallel flow through the plurality of bag type filters.

15. The system of claim 14, wherein the porosity of each of the plurality of bag type filters is substantially the same.

16. The system of claim 15, further comprising an air pressure conduit extending to inlet sides of the bag type filters for breaking up collected material for cleaning thereof in situ.

17. The system of claim 1, further comprising a coolant heat exchanger having a second storage tank in which coolant is accumulated and cooled.

18. The system of claim 17, wherein coolant is delivered to said second storage tank after it has passed through the mechanical filter.

19. The system of claim 18, wherein the second storage tank has an overflow return to the first mentioned storage tank.

20. The system of claim 18, wherein coolant is delivered to the second storage tank in a direction to cause a centrifugal separation therein.

* * * * *